704/258

United States Patent
Kurihara

(10) Patent No.: US 6,937,987 B2
(45) Date of Patent: Aug. 30, 2005

(54) CHARACTER INFORMATION RECEIVING APPARATUS

(75) Inventor: Kazuhiro Kurihara, Tokyo (JP)

(73) Assignee: NEC Corporation, Tokyo (JP)

( * ) Notice: Subject to any disclaimer, the term of this patent is extended or adjusted under 35 U.S.C. 154(b) by 773 days.

(21) Appl. No.: 09/876,636

(22) Filed: Jun. 7, 2001

(65) Prior Publication Data

US 2001/0053975 A1 Dec. 20, 2001

(30) Foreign Application Priority Data

Jun. 14, 2000 (JP) ........................................ 2000-178501

(51) Int. Cl.[7] .............................................. G10L 13/00
(52) U.S. Cl. ...................................... 704/276; 704/760
(58) Field of Search ................. 704/4, 9, 10, 251–257, 704/260, 266, 270, 276

(56) References Cited

U.S. PATENT DOCUMENTS

| | | | |
|---|---|---|---|
| 5,754,972 A | * 5/1998 | Baker et al. | ................. 704/200 |
| 5,845,248 A | 12/1998 | Nishida et al. | |
| 5,970,456 A | 10/1999 | Patillot et al. | |
| 6,078,885 A | * 6/2000 | Beutnagel | ................... 704/258 |
| 6,094,633 A | * 7/2000 | Gaved et al. | ............... 704/260 |
| 6,173,251 B1 | * 1/2001 | Ito et al. | ........................ 704/7 |

FOREIGN PATENT DOCUMENTS

| | | |
|---|---|---|
| CN | 1217542 A | 5/1999 |
| EP | 0 598 598 A1 | 5/1994 |
| GB | 2 353 927 A | 3/2001 |
| GB | 2 357 943 A | 7/2001 |
| JP | 01200181 * | 3/1991 |
| JP | 7-134597 | 5/1995 |
| JP | 7-181992 | 7/1995 |
| JP | 9-251298 | 9/1997 |
| JP | 9-252358 | 9/1997 |
| JP | 9-330093 | 12/1997 |
| JP | 10-133981 | 5/1998 |
| JP | 11-52986 | 2/1999 |
| JP | 11-55134 | 2/1999 |
| JP | 20000-112845 | 4/2000 |
| WO | WO 00/19408 | 4/2000 |

* cited by examiner

*Primary Examiner*—Abul K. Azad
(74) *Attorney, Agent, or Firm*—Scully, Scott, Murphy & Presser

(57) ABSTRACT

When a received character data is decoded by a decoder 10, a word division circuit 21 divides the data into word units, and a voice storage circuit 22 outputs a voice data corresponding to the divided character data, and a D/A converter 30 converts it into an analog signal, and it is output from a speaker 40 as voice. Thereby, the character data is output as voice. An output from the decoder 10 is stored in a memory 50, and is displayed on an LCD 60 as a character. The LCD 60 receives a byte number of a word for every word from the word division circuit 21, and highlights it for every byte number.

11 Claims, 1 Drawing Sheet

CHARACTER INFORMATION RECEIVING APPARATUS

BACKGROUND OF THE INVENTION

The present invention relates to a character information receiving apparatus for outputting voice in association with a character data and making recognition by means of hearing voice possible in addition to recognition by means of a character, and capable of selectively switching any one of them.

Conventionally, a character information receiving apparatus receives a data from an electronic mail, a character information service and so forth, and displays characters on an LCD. Accordingly, by reading the characters on the display, a user recognizes a message and so forth from a companion who transmitted the message.

However, in the above-described conventional character information receiving apparatus, since a character data cannot be output to the LCD as a character, it cannot be read as a character. Since there is a case where hearing is preferable rather than reading from exhaustion of eyes, only the character data is sometimes inconvenient.

SUMMARY OF THE INVENTION

The present invention is made to solve the above-mentioned problems.

The objective of the present invention is to provide a character information receiving apparatus for making it possible to recognize voice by means of hearing in addition to recognition by means of a character by outputting voice in association with a character data, and capable of selectively switching any one of them.

In accordance with the present invention, a character information receiving apparatus is obtained, which is characterized in that the apparatus has a decoder for decoding a reception data with respect to a character and outputting a character data, a word division circuit for dividing the above-described reception data into word units and sending the divided character data, a voice storage circuit for outputting a voice data corresponding to the above-described divided character data, a D/A (digital/analog) converter for converting the above-described voice data into an analog signal, and a speaker for outputting voice which is a converted analog signal, and the character data is output as voice.

Further, in accordance with the present invention, a character information receiving apparatus is obtained, which is characterized in that the apparatus has a character data storage section for storing a character data output from the above-described decoder, and an LCD (Liquid Crystal Display) for displaying the above-described stored character data on a screen as a character by a certain amount of byte numbers, and the above-described LCD receives a byte number of a word for every word from the above-described word division circuit and highlights it as a character for every byte number, and highlights it for a time period proportional to the above-described byte number.

Further, in accordance with the present invention, a character information receiving apparatus is obtained, which is characterized in that the above-described voice storage circuit can store voice data of a Japanese kana syllabary and a word unit in association with word data and store individual voice in association with character data, and the above-described word division circuit outputs the divided character data at a fixed data rate.

Further, in accordance with the present invention, a character information receiving apparatus is obtained, which is characterized in that shifting speed of highlighting is determined based on a data rate and a byte number of word data output from the above-described word division circuit.

Further, in accordance with the present invention, a character information receiving apparatus is obtained, which is characterized in that voice speed output from the above-described word division circuit is determined by the above-described data rate, and a character displayed on the above-described LCD is highlighted for every byte number reported from the above-described word division circuit in order from a head of a composition.

Further, in accordance with the present invention, a character information receiving apparatus is obtained, which is characterized in that shifting speed of highlighting is determined by an equation in which (1/(a data rate of word data)) is multiplied by a byte number, so that voice output from the above-described speaker and a character to be highlighted on the above-described LCD coincide with each other.

According to the present invention, a method of outputting character information comprising the steps of: decoding a reception data with respect to a character and outputting a character data; dividing said reception data into word units and sending said divided character data; outputting a stored voice data corresponding to said divided character data; converting said voice data into an analog signal; and outputting voice based said voice data which is a converted analog signal.

Further, the above present invention further comprising the steps of: storing said decoded character data, and receiving a byte number of a word for every word from divided character data and displaying highlights it as a character for every byte number, and displaying highlights it for a time period proportional to said byte number.

Further, in the above present invention, said stored voice data is voice data of a Japanese kana syllabary and a word unit in association with word data and store individual voice in association with character data.

Further, in the above present invention, said dividing step outputs the divided character data at a fixed data rate.

Further, in the above present invention, shifting speed of highlighting is determined based on a data rate and a byte number of word data.

Further, in the above present invention, voice speed is determined by said data rate, and a displayed character is highlighted for every byte number in order from a head of a composition.

Further, in the above present invention, shifting speed of highlighting is determined by an equation in which (1/(a data rate of word data)) is multiplied by a byte number, so that outputting of voice and displaying a character to be highlighted coincide with each other.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
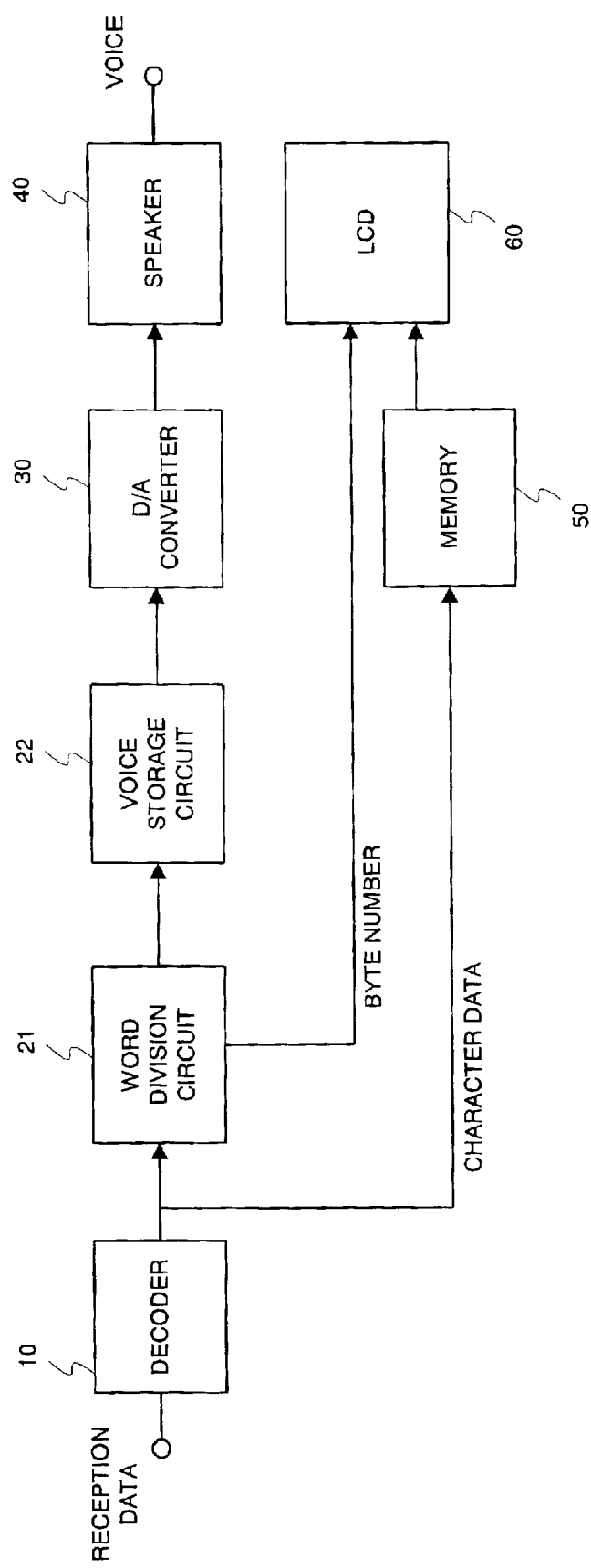
FIG. 1 is a block diagram showing one embodiment of a character information receiving apparatus of the present invention.

A character information receiving apparatus of the present invention is characterized in that a character data received from an electronic mail, a character information service and so forth is converted into a voice data and it is output from a speaker as voice, and concurrently, out of characters to be displayed on an LCD (Liquid Crystal Display), a word to be issued as voice is highlighted.

In order to output the character data as voice, in the present invention, a reception data with respect to decoded characters of an electronic mail and so forth is divided into word units. A voice data corresponding to the divided character data is converted into an analog signal, and it is output from the speaker as voice. Thereby, the character data is output as voice. Also, the reception data with respect to the decoded characters is stored in a character data memory one time, and is displayed on the above-described LCD as a character. The above-described LCD receives a byte number of a word for every word, and highlights the character data for every byte number. Accordingly, a character issued from the speaker is highlighted on the above-described LCD.

Below, one embodiment of the present invention will be explained particularly by referring to FIG. 1. A character information receiving apparatus in accordance with the present invention is constructed of a decoder 10, a word division circuit 21, a voice storage circuit 22, a D/A converter (a digital-analog converter) 30, a speaker 40, a memory (a character data storage section) 50, and an LCD (Liquid Crystal Display) 60.

The decoder 10 decodes a reception data and outputs a character data. The word division circuit 21 divides the character data into word units and converts them into word data, and outputs them at a fixed data rate. Also, the word division circuit 21 outputs byte numbers of the word data. The voice storage circuit 22 stores voice data of a Japanese kana syllabary and a word unit in association with the word data, and converts the word data input from the word division circuit 21 into voice data and outputs it. Also, the voice storage circuit 22 can store individual voice in association with the word data. The D/A converter 30 converts the voice data into an analog signal, and outputs it. The speaker 40 outputs the analog signal as voice. The memory 50 stores the character data output from the decoder 10. The LCD 60 displays the character data stored in the memory 50 on a screen as a character by a certain amount of byte numbers. Characters displayed on the LCD 60 are highlighted for a byte number unit of the word data reported from the word division circuit 21. As an example of the highlighting, there are a bold character, a blanched character and so forth. The highlighting is conducted for a time period proportional to the byte number, and a process shifts to enhancement of the next character. Shifting speed of the highlighting is determined based on a data rate at which the word division circuit 21 outputs the word data.

Next, an operation of the above-described character information receiving apparatus will be explained. The reception data of an electronic mail, a character information service and so forth is decoded to a character data by the decoder 10. The word division circuit 21 divides the decoded character data into word units. A character that could not be recognized as a word, and particles "wa", "wo", "ni" and so forth are divided for every one character. The voice storage circuit 22 stores voice data of a Japanese kana syllabary and a word unit in association with the word data, and converts the word data input from the word division circuit 21 into voice data and outputs it. The voice data is converted by the D/A converter 30 from a digital signal to an analog signal, and is output from the speaker 40 as voice. A data rate for transferring the word data from the word division circuit 21 to the voice storage circuit 22 is constant, and also, speed of the voice to be output is determined by this data rate. The memory 50 stores the character data output from the decoder 10. The LCD 60 can display the character data one time by a certain amount of byte numbers, which are stored in the memory 50. The displayed characters are highlighted in order from a head of a composition for every byte number reported from the word division circuit 21. Shifting speed of the highlighting is determined based on the data rate and the byte number of the word data output from the word division circuit 21, and can be represented by an equation shown in Eq.1 below.

$$(1/(\text{a data rate of word data})) \times (\text{a byte number}) \; (\text{second}) \quad [\text{Eq.1}]$$

In accordance with this, the voice output from the speaker and the character highlighted on the LCD 60 coincide with each other.

Also, in the voice storage circuit 22, individual voice can be stored in association with the word data. Accordingly, by collecting the voice data, it is possible to hear favorite voice for the character data.

In addition, a switch device is provided for selecting a mode for selecting any one of a case where the voice data is output from the speaker and a case where the character data is displayed on a screen through the LCD or a mode for selecting both of them, and for switching the modes to each other, although it is not shown in the drawings.

In accordance with the present invention, since the voice data in association with the character data are stored in the storage circuit, and the character data is converted into the voice data, it is possible to output the character data as voice, and to hear character information without reading it.

Also, in accordance with the present invention, since the data rate which is the basis of the voice speed and the data rate for the highlighting on the LCD coincide with each other, out of the characters to be displayed on the LCD, words to be issued from the speaker are highlighted, and it is possible to confirm at a look which parts of a composition displayed on the LCD become to be voice.

Also, in accordance with the present invention, since the individual voice can be stored in the voice storage circuit in association with the word data, it is possible to hear favorite voice for character information.

Also, in accordance with the present invention, since functions for the word division and the voice storage can be realized using an IC, special hardware is not needed, and accordingly, it can be applied to a mobile phone and an information terminal.

As one example in which these effects are utilized, in case of receiving a character information service by the mobile phone in an electric train, it is possible to hear favorite voice for the character information service, and in case that a switch from hearing to reading is needed when it is difficult to hear the service halfway due to a noise, it is possible to find at a look words of a part which is presently being read.

What is claimed is:

1. A character information receiving apparatus comprising:
    a decoder for decoding a reception data with respect to a character and outputting a character data;
    a word division circuit for dividing said reception data into word units and sending the divided character data;
    a D/A (digital/analog) converter for converting said voice data into an analog signal;
    a speaker for outputting voice which is a converted analog signal, and the character data is output as voice;
    a character data storage section for storing a character data output from said decoder, and an LCD (Liquid Crystal Display) for displaying said stored character data on a screen as a character by a certain amount of byte numbers;

wherein said LCD receives a byte number of a word for every word from said word division circuit and highlights it as a character for every byte number, and highlights it for a time period proportional to said byte number.

2. A character information receiving apparatus recited in claim 1, wherein said voice storage circuit can store voice data of a Japanese kana syllabary and a word unit in association with word data and store individual voice in association with character data, and said word division circuit outputs the divided character data at a fixed data rate.

3. A character information receiving apparatus recited in claim 2, wherein voice speed output from said word division circuit is determined by said data rate, and a character displayed on said LCD is highlighted for every byte number reported from said word division circuit in order from a head of a composition.

4. A character information receiving apparatus recited in claim 1, wherein shifting speed of highlighting is determined based on data rate and a byte number of word data output from said word division circuit.

5. A character information receiving apparatus recited in claim 1, wherein shifting speed of highlighting is determined by an equation in which (1/(a data rate of word data)) is multiplied by a byte number, so that voice output from said speaker and a character to be highlighted on said LCD coincide with each other.

6. A method of outputting character information comprising the steps of:

decoding a reception data with respect to a character and outputting a character data;

dividing said reception data into word units and sending said divided character data;

outputting a stored voice data corresponding to said divided character data converting said voice data into an analog signal;

outputting voice based on said voice data which is a converted analog signal;

storing said decoded character data, and receiving a byte number of a word for every word from divided character data and displaying highlights it as a character for every byte number, and displaying highlights it for a time period proportional to said byte number.

7. A method of outputting character information recited in claim 6, wherein said stored voice data is voice data of a Japanese kana syllabary and a word unit in association with word data and store individual voice in association with character data.

8. A method of outputting character information recited in claim 6, wherein said dividing step outputs the divided character data at a fixed data rate.

9. A method of outputting character information recited in claim 8, wherein voice speed is determined by said data rate, and a displayed character is highlighted for every byte number in order from a head of a composition.

10. A method of outputting character information recited in claim 6, wherein shifting speed of highlighting is determined based on a data rate and a byte number of word data.

11. A method of outputting character information recited in claim 6, wherein shifting speed of highlighting is determined by an equation in which (1/(a data rate of word data)) is multiplied by a byte number, so that outputting of voice and displaying a character to be highlighted coincide with each other.

* * * * *